(12) United States Patent
Kim et al.

(10) Patent No.: US 12,198,137 B2
(45) Date of Patent: Jan. 14, 2025

(54) V2X-BASED ELECTRONIC TOLL COLLECTION SYSTEM AND METHOD

(71) Applicant: Autocrypt Co., Ltd., Seoul (KR)

(72) Inventors: Duk Soo Kim, Seoul (KR); Eui Seok Kim, Seoul (KR); Sang Gyoo Sim, Seoul (KR); Ki Ho Joo, Seoul (KR); Jung Won Lee, Seongnam-si (KR); Jong Guk Lee, Suwon-si (KR); Jung Wook Kim, Seoul (KR); Sang Seok Lee, Seoul (KR); Sang Min Lee, Seoul (KR); Sook Jun Gweon, Seoul (KR); Hyun Kyung Park, Seoul (KR)

(73) Assignee: Autocrypt Co., Ltd., Seoul (KR)

( * ) Notice: Subject to any disclaimer, the term of this patent is extended or adjusted under 35 U.S.C. 154(b) by 148 days.

(21) Appl. No.: 18/059,341

(22) Filed: Nov. 28, 2022

(65) Prior Publication Data
US 2024/0144270 A1    May 2, 2024

(30) Foreign Application Priority Data
Nov. 1, 2022    (KR) .................. 10-2022-0143538

(51) Int. Cl.
*G06Q 20/38*    (2012.01)
*G06Q 20/02*    (2012.01)
(Continued)

(52) U.S. Cl.
CPC ....... *G06Q 20/4014* (2013.01); *G06Q 20/023* (2013.01); *H04W 4/025* (2013.01); *H04W 4/44* (2018.02); *G06Q 2240/00* (2013.01)

(58) Field of Classification Search
CPC .................................................. G06Q 20/4014
(Continued)

(56) References Cited

U.S. PATENT DOCUMENTS

| 6,845,362 B2 | 1/2005 | Furuta et al. |
| 7,212,989 B1 | 5/2007 | Taniguchi |

(Continued)

FOREIGN PATENT DOCUMENTS

| CN | 103383779 A | * 11/2013 |
| EP | 4080471 A1 | 10/2022 |

(Continued)

OTHER PUBLICATIONS

Petit, Jonathan et al. (2015). "Pseudonym Schemes in Vehicular Networks: A Survey", IEEE Communications Surveys & Tutorials. vol. 17, No. 1, pp. 228-255. doi: 10.1109/COMST.2014.2345420.

*Primary Examiner* — Chinedu C Agwumezie

(74) *Attorney, Agent, or Firm* — BROADVIEW IP LAW, PC

(57) ABSTRACT

A vehicle-to-everything (V2X) communication-based electronic toll collection system (ETCS) according to an embodiment of the present invention includes at least one roadside unit (RSU), a token issuer checking a de-identified token of a vehicle by communicating with an on-board unit (OBU) of the vehicle via the at least one roadside unit, and a clearing house communicating with the token issuer and charging a toll to a driver/owner of the vehicle. The token issuer generates toll information of the vehicle based on the de-identified token of the vehicle and location information of the at least one roadside unit involved in checking the de-identified token.

12 Claims, 12 Drawing Sheets

(51) Int. Cl.
  *G06Q 20/40* (2012.01)
  *H04W 4/02* (2018.01)
  *H04W 4/44* (2018.01)

(58) Field of Classification Search
  USPC .......................................................... 705/65
  See application file for complete search history.

(56) References Cited

U.S. PATENT DOCUMENTS

| | | |
|---|---|---|
| 2012/0265583 A1 | 10/2012 | Namdar |
| 2018/0061143 A1* | 3/2018 | Nelson .................... G06Q 20/10 |
| 2019/0051166 A1* | 2/2019 | Bronk .............. G08G 1/096716 |
| 2020/0169420 A1 | 5/2020 | Lee et al. |

FOREIGN PATENT DOCUMENTS

| | | | |
|---|---|---|---|
| JP | 10-222709 A | | 8/1998 |
| JP | 2003-30702 A | | 1/2003 |
| JP | 5249971 B2 | | 7/2013 |
| JP | 2016-143180 A | | 8/2016 |
| KR | 2002-0005719 A | | 1/2002 |
| KR | 10-2004-0004963 A | | 1/2004 |
| KR | 100809872 A | * | 3/2008 |
| KR | 100809872 B1 | * | 3/2008 |
| KR | 10-2020-0061189 A | | 6/2020 |

\* cited by examiner

FIG. 1
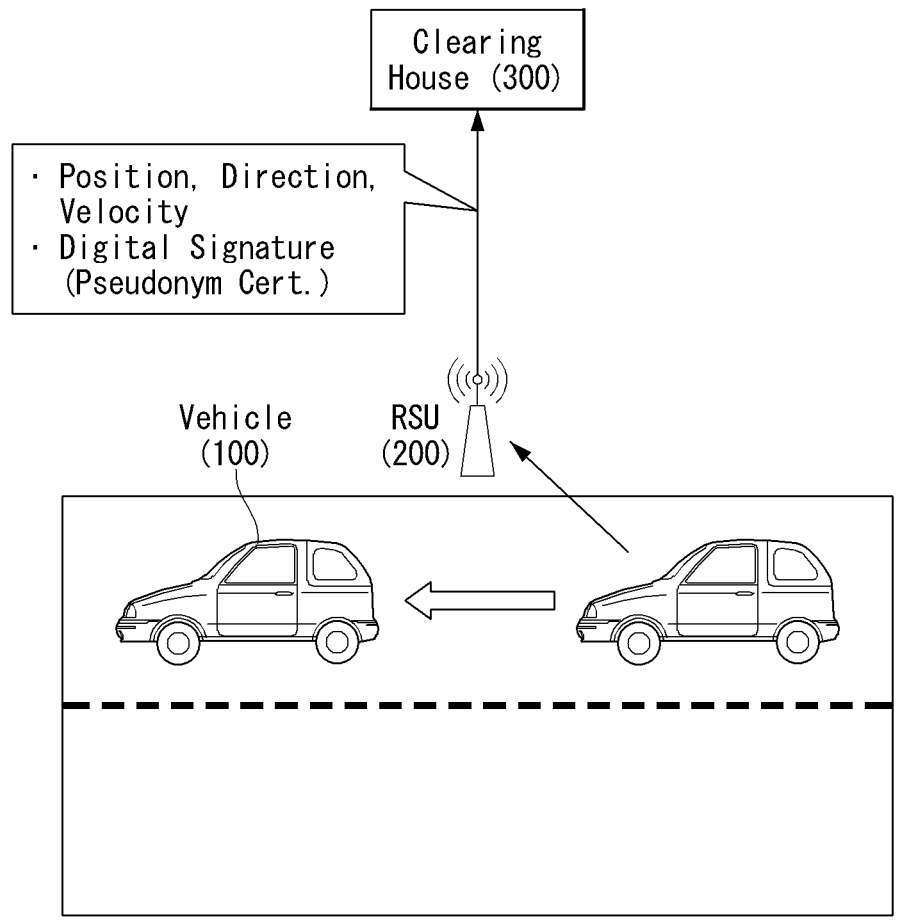
FIG. 2
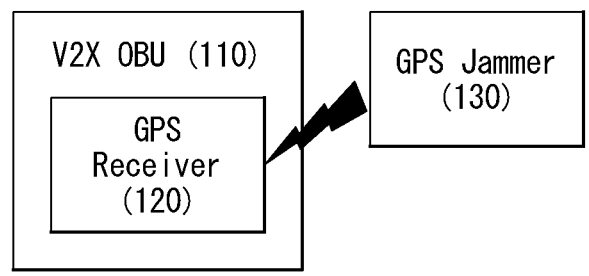
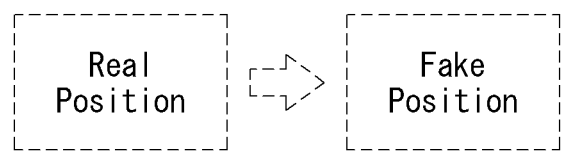

V2X-BASED ELECTRONIC TOLL COLLECTION SYSTEM AND METHOD

CROSS REFERENCE TO RELATED APPLICATION

The present application claims priority to Korean Patent Application No. 10-2022-0143538, filed Nov. 1, 2022, the entire contents of which is incorporated herein for all purposes by this reference.

BACKGROUND OF THE INVENTION

Technical Field

The present invention relates to an electronic toll collection system (ETCS), and more particularly, to a technology for implementing an ETCS based on vehicle-to-everything (V2X) communication and a method of collecting a toll using the ETCS.

Related Art

Recently, with the spread of an electronic toll collection system (ETCS), many drivers are using a wireless payment method (e.g., high pass) using an ETCS terminal installed in a vehicle instead of cash or a card.

The electronic toll collection system is installed and operated at toll gates on toll roads such as expressways. The electronic toll collection system charges road tolls automatically in a way that the vehicle terminal or on-board unit (OBU) mounted on the vehicle subject to toll charges and the roadside unit (RSU) installed on the roadside for automatic collection of tolls are interoperate with each other. Accordingly, when a user enters a lane supporting the service in a vehicle with a terminal attached thereto, a toll is collected based on the authenticated card and registered vehicle data acquired through dedicated short-distance communication between the vehicle terminal and the roadside unit.

Such an electronic toll collection system uses a roadside unit (RSU) and a recognition unit to recognize the license plate of the vehicle. These units make it possible to charge a toll to a vehicle running at high speed by detecting the entrance, passing, and exit of the vehicle.

In order to detect the entrance, travel, and exit of the vehicle, various electronic devices are installed and they include antennas for wireless communication, radio frequency (RF) modules for communication with terminals mounted on the vehicle, cameras, and recognition devices for checking the vehicle's progress lane.

For billing, a method of deducting a certain amount of charge from the balance of a prepaid card inserted into the vehicle-mounted device and updating and recording the balance on the prepaid card, or automatically deducting a certain amount of charge from a pre-registered user's bank account.

However, the conventional general ETCS system has a problem of not being able to properly charge the toll in response to an attempt by a dishonest user to disable the toll collection device mounted on a vehicle to avoid charging.

In an attempt to solve this problem, Japanese Patent Registration JP5249971 "Toll Collection System" was proposed as a prior document for determining attempt for fraudulent charges and additional collection for the fraudulent charges. However, the aforementioned technology, which sets an extended charging target area wider than the charging target area and uses a wide-area communication device to detect the entrance and exit information on the extended charging target area of the vehicle, still has a problem in that it is difficult to properly respond to the case of deceiving the location or incapacitating the location tracking itself of the vehicle-mounted device.

SUMMARY

It is an object of the present invention to provide a V2X communication-based electronic toll collection system (ETCS) and an operation method thereof that are robust even in an unstable environment of global positioning system (GPS) signals and communication signals.

It is another object of the present invention to provide an ETCS and an operation method thereof that are capable of effectively collecting a toll despite an attempt by a dishonest user to hide the location information of the vehicle and obstruct the charging.

It is another object of the present invention to provide an ETCS and an operation method thereof that are capable of separating the actual driving information and location information of the vehicle from the toll information and providing a clearing house with only the toll information in which the actual driving and location information of the vehicle is separated.

It is still another object of the present invention to provide an improved ETCS and an operation method thereof that are capable of stably collecting a toll and protecting location privacy of the vehicle.

In order to solve the above problems, a vehicle-to-everything (V2X) communication-based electronic toll collection system (ETCS) of the present invention includes at least one roadside unit (RSU), a token issuer checking a de-identified token of a vehicle by communicating with an on-board unit (OBU) of the vehicle via the at least one roadside unit, and a clearing house communicating with the token issuer and charging a toll to a driver/owner of the vehicle. The token issuer generates toll information of the vehicle based on the de-identified token of the vehicle and location information of the at least one roadside unit involved in checking the de-identified token.

The token issuer may issue the de-identified token and transmit the token to the vehicle via a first roadside unit or receive a previously issued de-identified token from the vehicle via the first roadside unit and verifies the received token. The token issuer may receive the previously issued de-identified token from the vehicle via a second roadside unit and verifies the received token.

The token issuer may generate the toll information based on a first location information of the first roadside unit and a second location information of the second roadside unit.

The at least one roadside unit may transmit a message requesting submission of the de-identified token to the vehicle, forward, upon receipt of a message requesting issuance of a de-identified token from the vehicle, the message requesting issuance of a de-identified token to the token issuer, and forward, upon receipt of the previously issued de-identified token from the vehicle, the de-identified token to the token issuer.

The token issuer may receive a message requesting issuance of a de-identified token from the vehicle via a first roadside unit, issue the de-identified token, and transmit the de-identified token to the vehicle via the first roadside unit.

The token issuer may transmit to the clearing house a message requesting verification of validity of identification information of the vehicle that is included in the message requesting issuance of a de-identified token and issue, upon the clearing house verifying the validity of the identification information of the vehicle, the de-identified token.

The V2X communication-based electronic toll collection system (ETCS) according to an embodiment of the present invention may further include a third roadside unit receiving a message requesting registration of payment account information from the vehicle and forwarding the message to the clearing house.

The token issuer may verify at least part of an actual driving route of the vehicle independently of the location information of the vehicle that is provided by the on-board unit of the vehicle.

The token issuer may generate the toll information of the vehicle independently of location information of the vehicle that is provided by the on-board unit of the vehicle.

The token issuer may separate the toll information from actual location information of the vehicle and transmit the toll information separated from the actual location information of the vehicle to the clearing house.

A vehicle-to-everything (V2X) communication-based electronic toll collection method according to an embodiment of the present invention includes checking, at a token issuer, a de-identified token of a vehicle by communicating with an on-board unit (OBU) of the vehicle via at least one roadside unit (RSU), generating, at the token issuer, toll information of the vehicle based on the de-identified token of the vehicle and location information of the at least one roadside unit involved in checking the de-identified token, transmitting, at the token issuer, the toll information to a clearing house, and charging, at the clearing house, a toll to a driver/owner of the vehicle.

Checking, at the token issuer, the de-identified token may include issuing, at the token issuer, the de-identified token and transmitting the token to the vehicle via a first roadside unit or receiving a previously issued de-identified token from the vehicle via the first roadside unit and verifying the received token, and receiving the previously issued de-identified token from the vehicle via a second roadside unit and verifying the received token.

Generating, at the token issuer, the toll information may include generating the toll information based on a first location information of the first roadside unit and a second location information of the second roadside unit.

The V2X communication-based electronic toll collection method according to an embodiment of the present invention may further include transmitting, at the at least one roadside unit, a message requesting submission of the de-identified token to the vehicle, forwarding, at the at least one roadside unit upon receipt of a message requesting issuance of a de-identified token from the vehicle, the message requesting issuance of a de-identified token to the token issuer, and forwarding, at the at least one roadside unit upon receipt of the previously issued de-identified token from the vehicle, the de-identified token to the token issuer.

Checking, at the token issuer, the de-identified token may include receiving a message requesting issuance of a de-identified token from the vehicle via a first roadside unit, issuing the de-identified token, and transmitting the de-identified token to the vehicle via the first roadside unit.

Checking, at the token issuer, the de-identified token may include transmitting, after receiving the message requesting issuance of a de-identified token, to the clearing house a message requesting verification of validity of identification information of the vehicle that is included in the message requesting issuance of a de-identified token and receiving a message including a validity verification result on the identification information of the vehicle from the clearing house.

Here, issuing the de-identified token includes issuing, upon the clearing house verifying the validity of the identification information of the vehicle based on the message including the validity verification result, the de-identified token.

The V2X communication-based electronic toll collection method according to an embodiment of the present invention may further include receiving, at a third roadside unit, a message requesting registration of payment account information from the vehicle and forwarding the message requesting registration of payment account information to the clearing house.

Generating, at the token issuer, the toll information may include verifying at least part of an actual driving route of the vehicle independently of location information of the vehicle that is provided by the on-board unit of the vehicle.

Generating, at the token issuer, the toll information may include generating the toll information of the vehicle independently of location information of the vehicle that is provided by the on-board unit of the vehicle.

Transmitting, at the token issuer, the toll information to a clearing house may include separating the toll information from actual location information of the vehicle and transmitting the toll information separated from the actual location information of the vehicle to the clearing house.

BRIEF DESCRIPTION OF THE DRAWINGS

FIG. 1 is a conceptual diagram illustrating an example of a V2X-based electronic toll collection system (ETCS);

FIG. 2 is a conceptual diagram illustrating an example of a scenario of an toll violation attempt for the vehicle of FIG. 1;

DETAILED DESCRIPTION OF THE INVENTION

Figure 3:
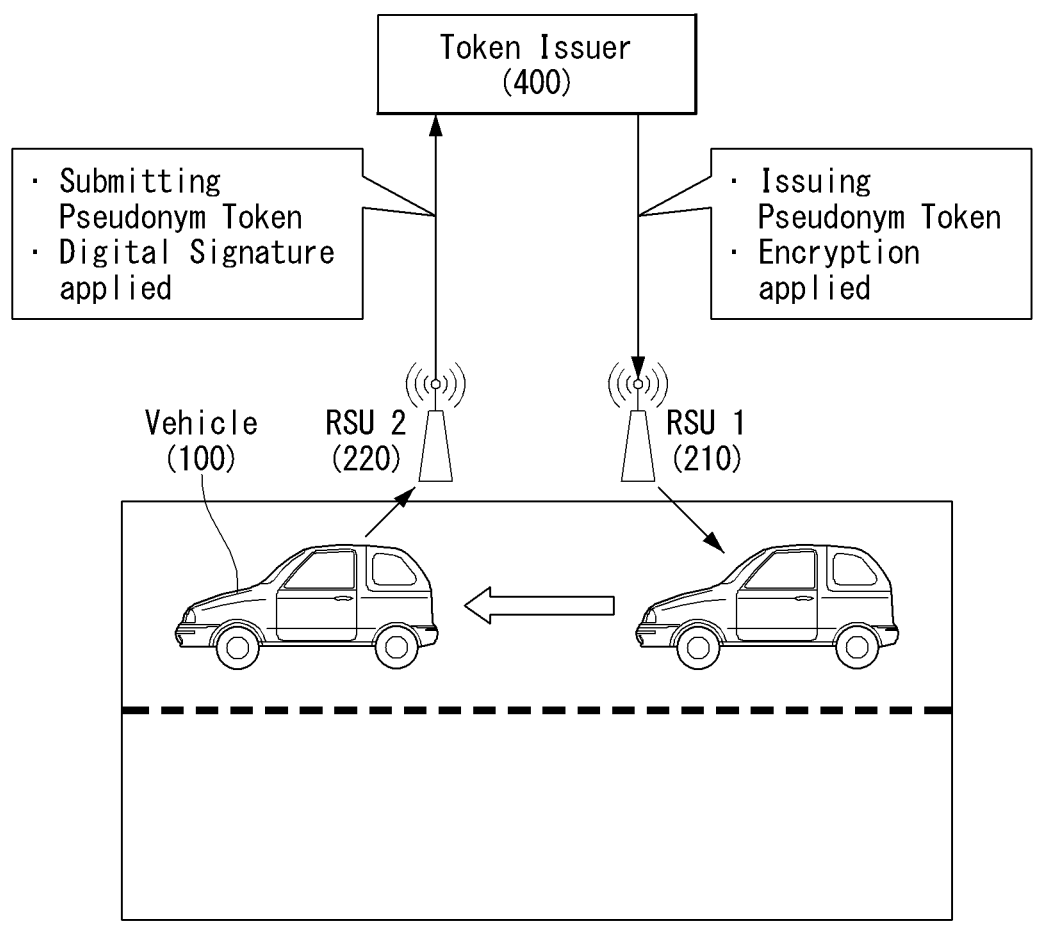
FIG. 3 is a conceptual diagram illustrating a V2X-based electronic toll collection system (ETCS) according to an embodiment of the present invention.

Various changes may be made to the invention, and the invention may have various embodiments, such that exemplary embodiments will be illustrated in the drawings and described in detail. However, such an embodiment is not intended to limit the invention and it should be understood that the embodiment include all changes, equivalents, and substitutes within the spirit and scope of the invention. Throughout the drawings, like reference numerals refer to like components.

Terms such as "first," "second," "A," "B," etc. may be used to describe various components, but the components should not be limited by these terms. The terms are used only for distinguishing one component from another component. For example, a first element may be referred to as a second element and, similarly, the second element may be referred to as the first element, without departing from the scope of the present invention. The expression "and/or" is taken as a specific disclosure of each and any combination of enumerated things.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

All matters disclosed in the prior literatures such as vehicle to everything (V2X) technology, and a GPS reception technology to acquire vehicle location information, a technology to collect information about vehicles entering/exiting a toll charge area or extended (wide) toll charge area, and a technology for charging and settlement using a communication network that disclosed in Japanese Patent Registration JP5249971 "Toll Collection System" presented above as the prior art may be included as part or all of the constitution of the present invention within the scope consistent with the purpose of the present invention. Since those skilled in the art can clearly infer the association with the purpose and constitution of the present invention from the contents of the prior art documents, too detailed descriptions that may obscure the purpose of the present invention will be omitted and replaced by introducing the prior art documents.

Preferred embodiments of the present invention are described with reference to the accompanying drawings in detail. In describing the present invention, in order to facilitate the overall understanding, the same reference numbers are used throughout the drawings to refer to the same components, and duplicate descriptions of the same components are omitted.

FIG. 1 is a conceptual diagram illustrating an example of a V2X-based electronic toll collection system (ETCS).

The on-board unit (OBU) 110 of the vehicle 100 may periodically report the position, direction, and speed of the vehicle 100 to the clearing house 300 via the roadside unit (RSU) 200.

Here, the location, direction, and speed information of the vehicle 100 may be encrypted by a digital signature using a de-identified certificate.

The de-identified certificate may be, for example, a pseudonym certificate (Pseudonym certification).

However, as described above, a dishonest user may attempt to avoid paying a toll for the vehicle 100.

FIG. 2 is a conceptual diagram illustrating an example of a scenario in which a vehicle of FIG. 1 attempts an illegal toll evasion.

With reference to FIG. 2, the on-board unit 110 includes a GPS receiver 120.

A dishonest user may install a GPS jammer 130 in the vehicle 100 to attempt to interfere the normal operation of the GPS receiver 120.

Here, in the case where the operation of the GPS receiver 120 is interrupted, the on-board unit 110 cannot report the exact location of the vehicle 100. The location information reported by the on-board device 110 is not the actual location of the vehicle 100 but a fake location.

In this case, the clearing house 300 cannot charge a toll for the vehicle 100 because it does not know the actual location of the vehicle 100.

Although the scenario of FIG. 2 illustrates an attempt by a dishonest user to avoid paying a vehicle toll, a similar situation may occur under various conditions that may cause a malfunction of the GPS receiver 120.

For example, even in an environment in which it is difficult for the GPS receiver 120 to operate normally due to a weak GPS signal, or an environment in which it is difficult to accurately estimate the location of the vehicle 100 due to a weak communication signal, it may be difficult for the clearing house 300 to charge a toll for the vehicle 100.

The present invention proposes an electronic toll collection system (ETCS) and an operation method thereof that are capable of stably securing location information of the vehicle 100 and collecting a toll for the vehicle 100 in consideration of these various obstacles.

In addition, the roadside unit 200 may report the status of the messages received from the vehicle 100 to the settlement station 300. Here, the status of the messages may be reported including the ID of the roadside unit 200, the time, the ID of the vehicle 100, and radio receiving strength.

The clearing house 300 may detect a misbehavior of the vehicle 100 by comparing the radio receiving strength included in the messages.

This technique refers to a method in which a telecommunication service provider (TelCo) checks the location of a handset from a base station.

However, this technique may violate location location privacy of the vehicle 100, because the clearing house 300 has to track the actual moving path and location of the vehicle 100.

Considering the cooperative intelligent transport system (C-ITS) stipulating to protect the location privacy of each vehicle 100, a new ETCS and an operating method thereof are required to meet these needs.

The present invention proposes an ETCS and an operating method thereof that are capable of securing location information of the vehicle 100 stably and collect a toll for the vehicle 100 while protecting the location privacy of vehicle 100 in consideration of various obstacles described above.

FIG. 3 is a conceptual diagram illustrating a V2X-based electronic toll collection system (ETCS) according to an embodiment of the present invention.

With reference to FIG. 3, the token issuer 400 is disposed independently of the clearing house 300 and performs an independent role.

The V2X communication-based electronic toll collection system (ETCS) according to an embodiment of this invention includes at least one roadside unit RSU 1 210 and RSU 2 220, a token issuer 400 checking the de-identified token of the vehicle 100 by communicating with the on-board unit (OBU) of the vehicle 100 via the at least one roadside unit 210 and 220, and a clearing house 300 communicating with the token issuer 400 and charging a toll to the driver/owner 500 of the vehicle 100. The token issuer 400 generates the toll information of the vehicle based on the de-identified token of the vehicle 100 and the location information of the at least one roadside unit 210 and 220 involved in the verification process of the de-identified token. The token issuer 400 may issue a de-identified token and deliver the token to the vehicle 100 via the first roadside unit RSU 1 210 or verify the previously issued de-identified token received from the vehicle 100 via the first roadside unit RSU1 210. The token issuer 400 may receive and verify the previously issued de-identified token from the vehicle 100 via the second roadside unit RSU 2 220.

The token issuer 400 may generate toll information of the vehicle 100 based on the first location information about the first roadside unit 210 and the second location information about the second roadside unit 220.

The at least one roadside unit 210 and 220 may transmit a message requesting submission of a de-identified token to the vehicle 100, forward, upon receipt of a message requesting issuance of a de-identified token from the vehicle 100, the message requesting issuance of a de-identified token to the token issuer 400, and deliver, upon receipt of the previously issued de-identified token from the vehicle 100, the de-identified token to the token issuer 400.

The token issuer 400 may receive a message requesting issuance of a de-identified token from the vehicle 100 via the first roadside unit 210, issue a de-identified token, and transmit the de-identified token to the vehicle 100 via the first roadside unit 210.

The token issuer 400 may transmit to the clearing house 300 a message requesting verification of the validity of the identification information of the vehicle 100, which is included in the message requesting issuance of a de-identified token, and issue a de-identified token, when the validity of the identification information of the vehicle 100 is verified by the clearing house 300.

The token issuer 400 may verify at least part of the actual driving route of the vehicle 100 independently of the location information of the vehicle 100 that is provided by the on-board unit 110 of the vehicle 100. Accordingly, even when the vehicle 100 reports fake location information via the on-board unit 110, the ETCS according to the embodiment of the present invention can independently track the actual driving route of the vehicle 100 to charge and collect a toll for the vehicle 100 accurately.

The token issuer 400 may generate the toll information of the vehicle 100 based on the actual driving route of the vehicle 100 independently of the location information of the vehicle 100 provided by the on-board unit 110 of the vehicle 100. That is, the token issuer 400 may generate the toll information of the vehicle 100 independently of the location information of the vehicle 100 provided by the on-board unit 110 of the vehicle 100.

The token issuer 400 may issue a pseudonymized token as a de-identified token and deliver the pseudonymized token to the vehicle 100 via the first roadside unit 210.

Here, the pseudonymization token may be transmitted in an encrypted manner.

The vehicle 100 may submit the previously issued pseudonymized token to the token issuer 400 via the second roadside unit 220. Here, the pseudonymized token submitted may be encrypted with a digital signature.

Each of the roadside units 210 and 220 may broadcast a message requesting submission of a pseudonymized token to the vehicle 100 approaching within a predetermined distance area. Upon receipt of the message requesting submission of a pseudonymized token, the vehicle 100 may check whether it has a pseudonymized token to submit, in response to having a pseudonymized token and transmit, in response to having no pseudonymized token, a message requesting issuance of a pseudonymized token to the nearest one of the roadside units 210 and 220.

Here, the roadside units 210 and 220 may each communicate with the adjacent vehicle 100 to check whether the vehicle 100 has a pseudonymized token and resultantly request issuance of a pseudonymized token or receive and verify a previously issued pseudonymized token and then transmit the verified pseudonymized token to the token issuer 400.

Figure 4:
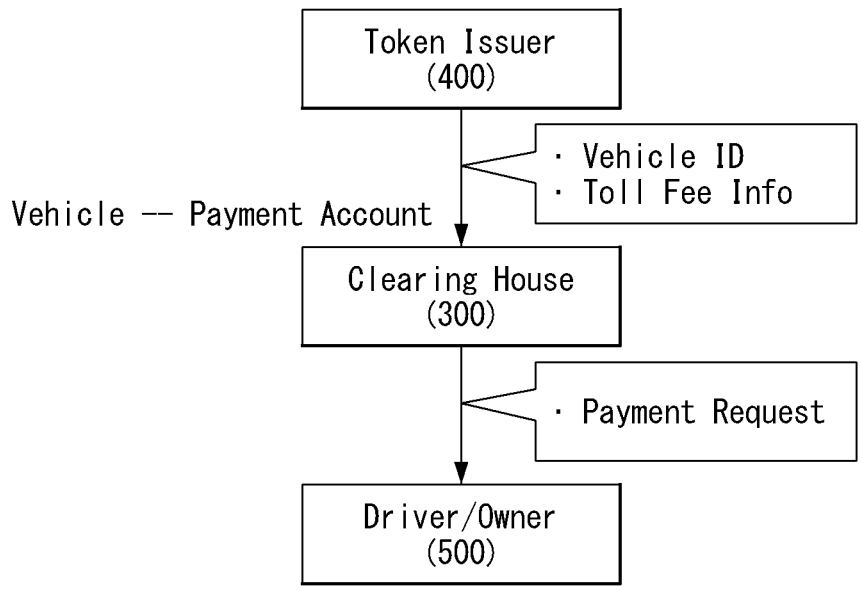
FIG. 4 is a conceptual diagram illustrating information transmitted by each entity of a V2X-based electronic toll collection system (ETCS) according to an embodiment of the present invention.

FIG. 4 is a conceptual diagram illustrating information transmitted by each entity of a V2X-based electronic toll collection system (ETCS) according to an embodiment of the present invention.

The token issuer 400 may separate the toll information of the vehicle 100 from the actual location information of the vehicle 100 and transmit the toll information separated from the actual location information of the vehicle 100 to the clearing house 300. That is, the token issuer 400 transmits only the pseudonymized ID and toll information of the vehicle 100 to the clearing house 300 other than the actual location information of the vehicle 100, thereby protecting location privacy of the vehicle 100.

The token issuer 400 may generate a pseudonymized token based on the pseudonymization certificate received from the vehicle 100.

The clearing house 300 may manage the payment account of the vehicle 100.

The clearing house 300 may retrieve the actual ID of the vehicle 100 with the support of the V2X security infrastructure. The clearing house 300 may charge and request a total toll to the driver/owner 500 of the vehicle 100.

Figure 5:
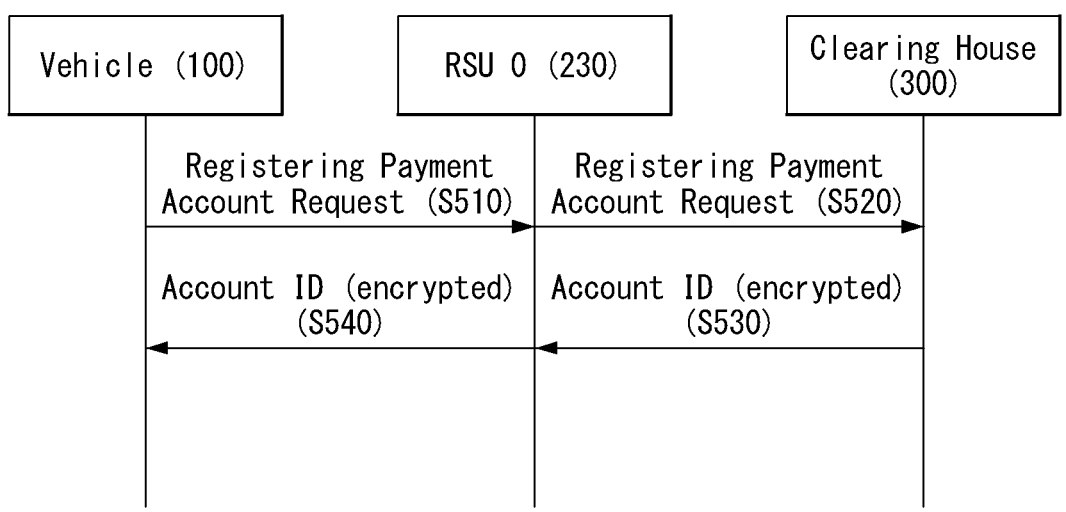
FIG. 5 is a conceptual diagram illustrating a protocol performed for registration of payment account information of a vehicle in a V2X-based electronic toll collection system (ETCS) according to an embodiment of the present invention.

FIG. 5 is a conceptual diagram illustrating a protocol performed for registration of payment account information of a vehicle in a V2X-based electronic toll collection system (ETCS) according to an embodiment of the present invention.

The V2X communication-based electronic toll collection system (ETCS) according to an embodiment of the present invention may further include a third roadside unit RSU 0 230 that receives a message requesting registration of payment account information from the vehicle 100 and transmits it to the clearing house 300.

The vehicle 100 may transmit, at step S510, a message requesting registration of a payment account to the third roadside unit 230 in advance before the start of driving. Here, the vehicle 100 may perform the operation of step S510 before the start of driving or before entering the toll road.

The third roadside unit 230 may forward, at step S520, the message requesting registration of a payment account of the vehicle 100 to the clearing house 300.

The clearing house 300 may encrypt a payment account ID of the vehicle 100 and transmit, at step S530, the encrypted payment account ID to the third roadside unit 230 in response to the message requesting registration of a payment account of the vehicle 100.

The third roadside unit 230 may transmit the encrypted payment account ID to the vehicle 100 at step S540.

Figure 6:
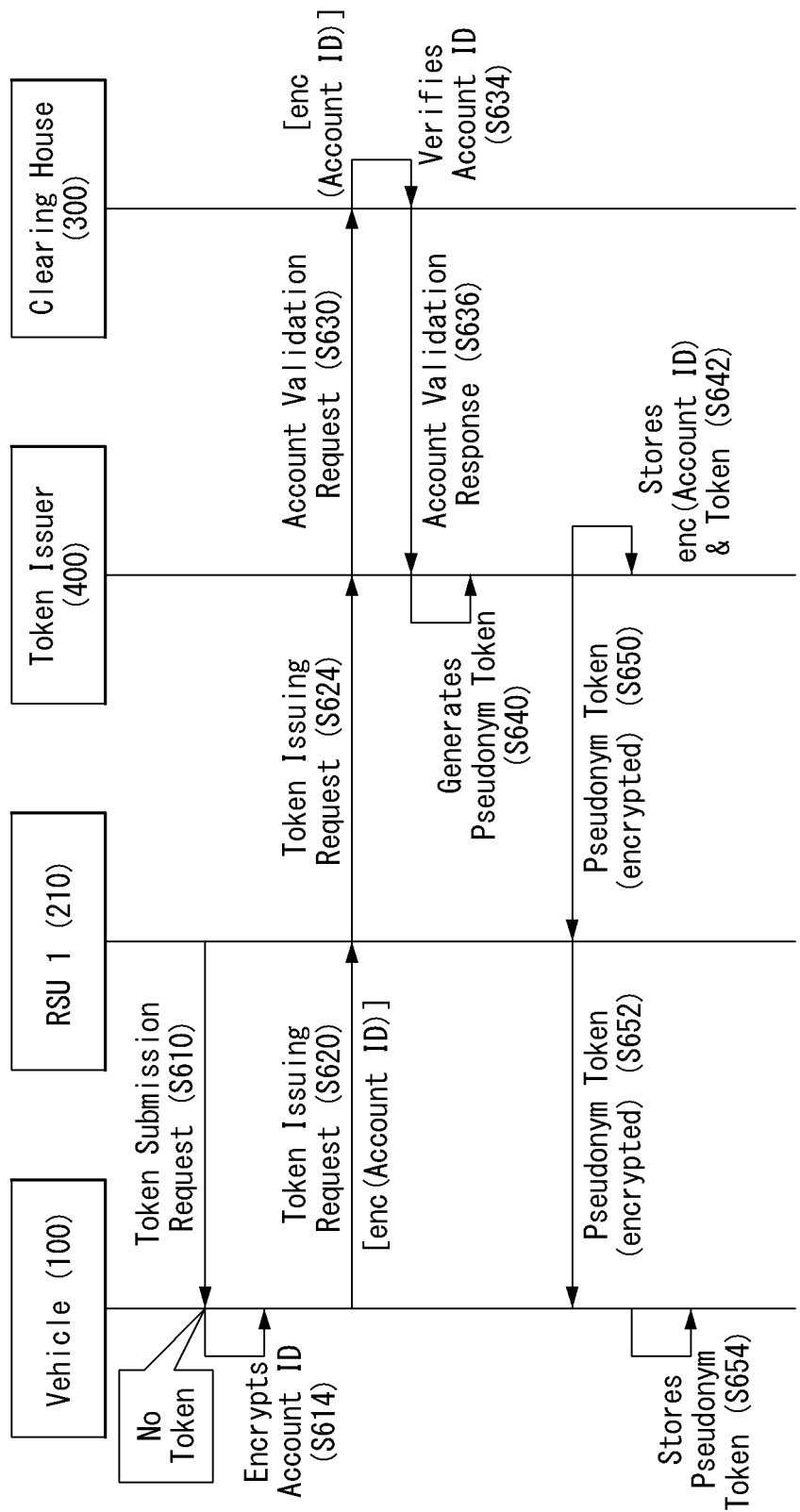
FIG. 6 is a conceptual diagram illustrating a protocol performed to generate a de-identified token of a vehicle in a V2X-based electronic toll collection system (ETCS) according to an embodiment of the present invention.

FIG. 6 is a conceptual diagram illustrating a protocol performed to generate a de-identified token of a vehicle in a V2X-based electronic toll collection system (ETCS) according to an embodiment of the present invention;

The first roadside unit 210 may transmit, at step S610, a message requesting submission of a token to the adjacent vehicle 100.

The vehicle 100 may check whether a token is held.

When there is no token held, the vehicle 100 may encrypt, at step S614, an account ID to request issuance of a token.

The vehicle 100 may transmit a token issuance request message to the first roadside unit 210 at step S620. Here, the token issuance request message may include an encrypted version [enc(Account ID)] of the payment account ID of the vehicle 100.

The first roadside unit 210 may forward, at step S624, the token issuance request message including the encrypted payment account ID of the vehicle 100 to the token issuer 400.

The token issuer 400 may transmit, at step S630, an account validity verification request message for the encrypted payment account ID of the vehicle 100 to the clearing house 300.

The clearing house 300 may verify, at step S634, the account validity of the encrypted payment account ID of the vehicle 100.

The clearing house 300 may transmit at step S636 an account validity verification response message to the token issuer 400 as an account validity verification result based on the encrypted payment account ID of the vehicle 100.

When the encrypted payment account ID of the vehicle 100 is verified as valid based on the account validity verification response message, the token issuer 400 may generate a pseudonymized token at step S640.

The token issuer 400 may store, at step S642, the generated pseudonymized token in an associated manner with the encrypted payment account ID of the vehicle 100.

The token issuer 400 may transmit, at step S650, the encrypted pseudonymized token to the first roadside unit 210.

The first roadside unite 210 may forward, at step S652, the encrypted pseudonymized token to the vehicle 100.

The vehicle 100 may store the pseudonymized token at step S654.

Figure 7:
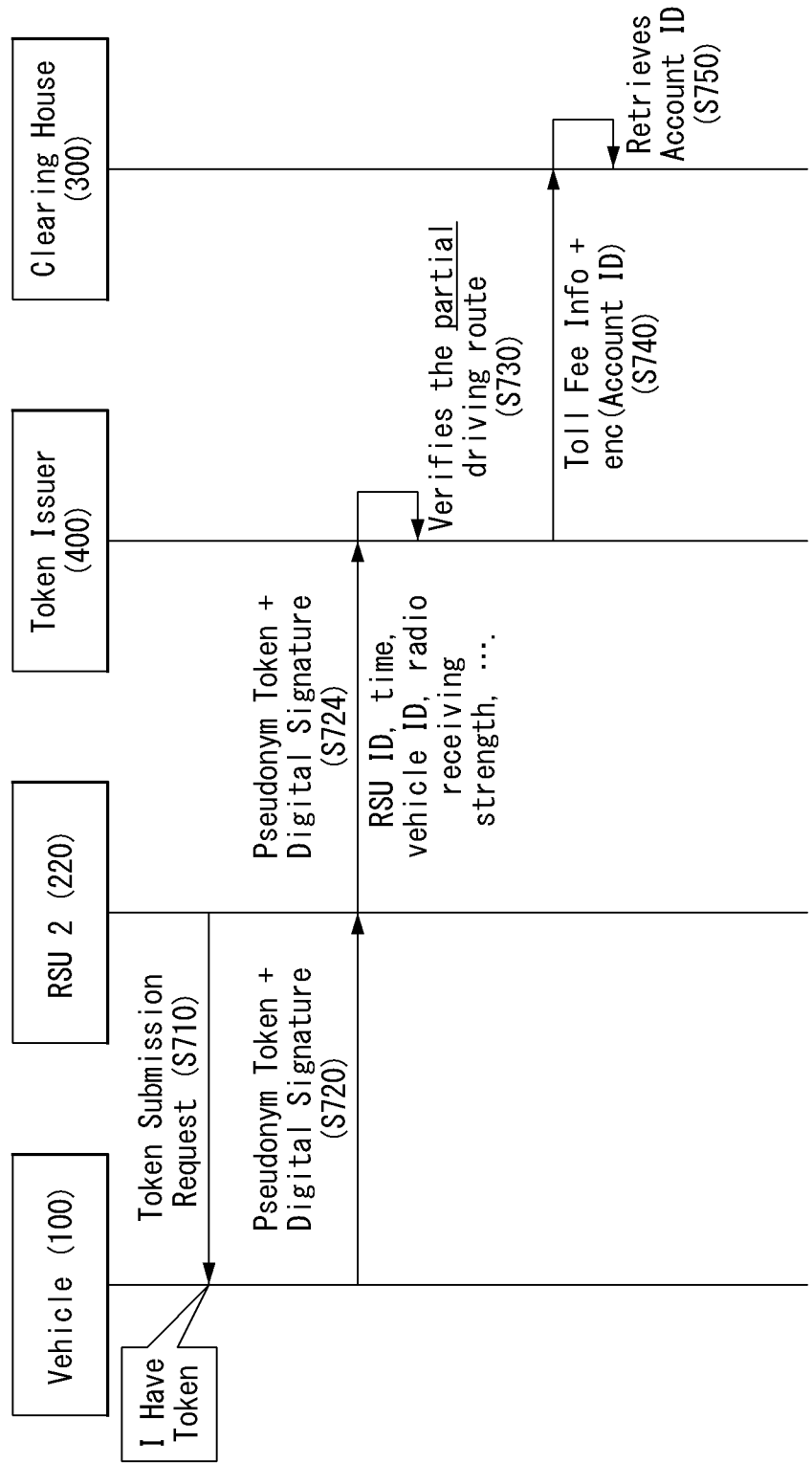
FIG. 7 is a conceptual diagram illustrating a protocol performed to identify and verify a de-identified token of a vehicle and generate toll information in a V2X-based Electronic Toll Collecting System (ETCS) according to an embodiment of the present invention.

FIG. 7 is a conceptual diagram illustrating a protocol performed to identify and verify a de-identified token of a vehicle and generate toll information in a V2X-based Electronic Toll Collecting System (ETCS) according to an embodiment of the present invention.

The first roadside unit 220 may transmit, at step S710, a message requesting submission of a token to the adjacent vehicle 100.

The vehicle 100 may check whether a token is held.

When there is a token held, the vehicle 100 may transmit, at step S720, a pseudonymized token together with or encrypted by a digital signature to the second roadside unit 220.

The second roadside unit 220 may forward, at step S624, the encrypted pseudonymized token of the vehicle 100 to the token issuer 400.

In this case, the second roadside unit 220 may transmit information on the overall status of the message received from the vehicle 100 to the token issuer 400 together with the pseudonymized token.

For example, the status information of the message may include the ID of the second roadside unit 220, the time, the vehicle ID, and the radio receiving strength.

The token issuer 400 may verify the partial driving route of the vehicle 100 at step S730. The token issuer 400 may verify the partial driving route based on the IDs of the roadside units from which the same pseudonymization token is received or from which the pseudonymization token for the payment account ID of the same vehicle 100 is received, the radio receiving strength, etc. Consequently, it is possible to track the actual driving route of the vehicle 100 based on the information about the geographical locations and passage time points of the roadside units through the vehicle 100 has passed nearby.

According to another embodiment of the present invention, the token issuer 400 may delete the driving route of the vehicle 100 before the section in which the toll calculation is completed, in order to protect the location privacy of the vehicle 100.

The token issuer 400 may transmit, at step S740, the toll information and the encrypted payment account ID information of the vehicle 100 to the clearing house 300.

The clearing house 300 may retrieve and verify, at step S750, the encrypted payment account ID information of the vehicle 100.

Figure 8:
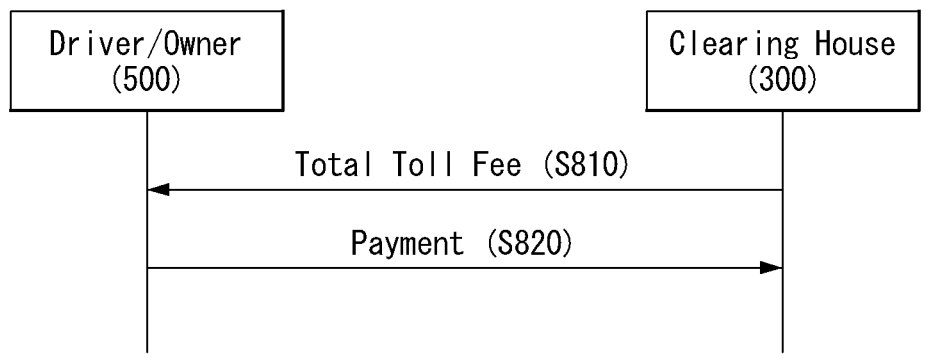
FIG. 8 is a conceptual diagram illustrating a protocol performed to charge a toll in a V2X-based Electronic Toll Collecting System (ETCS) according to an embodiment of the present invention.

FIG. 8 is a conceptual diagram illustrating a protocol performed to charge a toll in a V2X-based Electronic Toll Collecting System (ETCS) according to an embodiment of the present invention.

When the encrypted payment account ID is verified as valid at step S750 of FIG. 7, the clearing house 300 may charge the total toll to the driver/owner 500 of the vehicle at step S810.

The driver/owner 500 of the vehicle may pay the charged toll at step S820.

Figure 9:
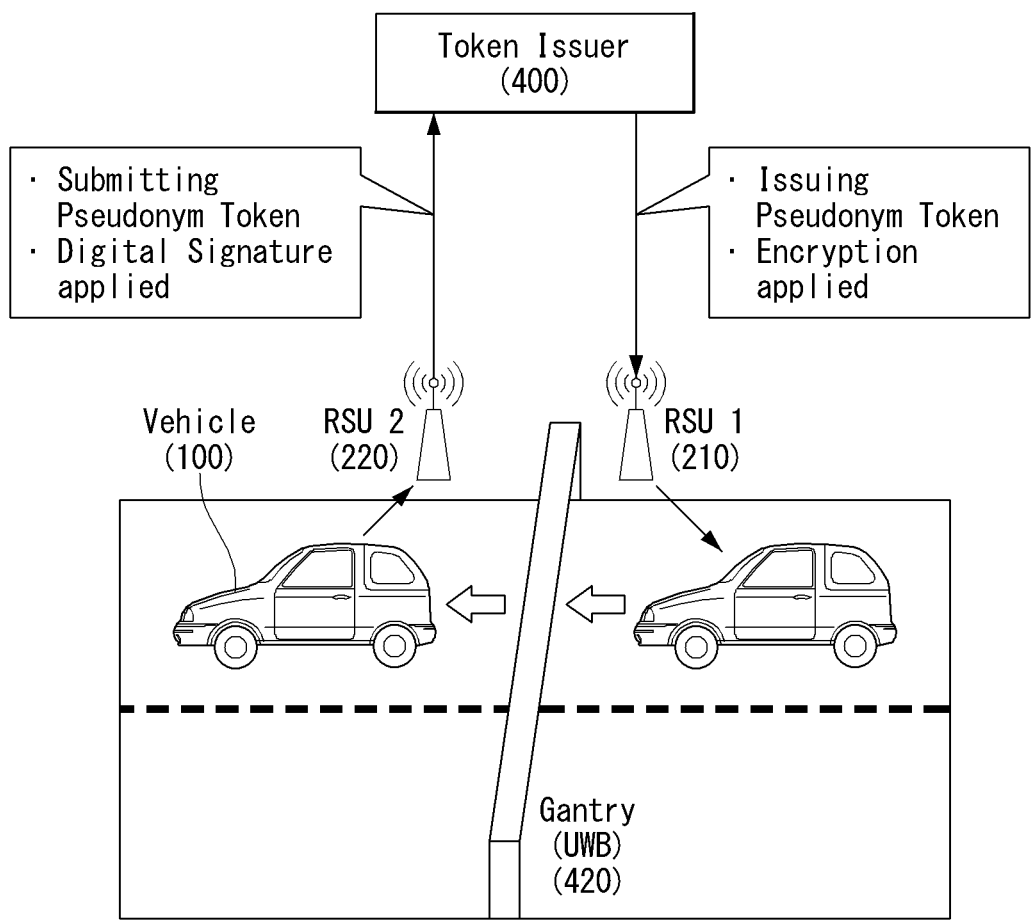
FIG. 9 is a conceptual diagram illustrating a V2X-based electronic toll collection system (ETCS) according to an embodiment of the present invention.

FIG. 9 is a conceptual diagram illustrating a V2X-based electronic toll collection system (ETCS) according to an embodiment of the present invention.

In the drawing of FIG. 9, description of components identical in function to those in FIG. 3 will be omitted.

With reference to FIG. 9, a gantry 420 may be disposed between the first and second roadside units 210 and 220. The gantry 420 may be provided with an ultra-wideband (UWB) that checks the actual approach of the vehicle to provide a non-reputable evidence that the vehicle 100 has passed the gantry 420.

Such an embodiment may provide an effect of robustly tracking the location of the vehicle 100 and collecting a toll even in an environment where radio attacks, signal jamming, GPS interruption, etc. occur.

Figure 10:
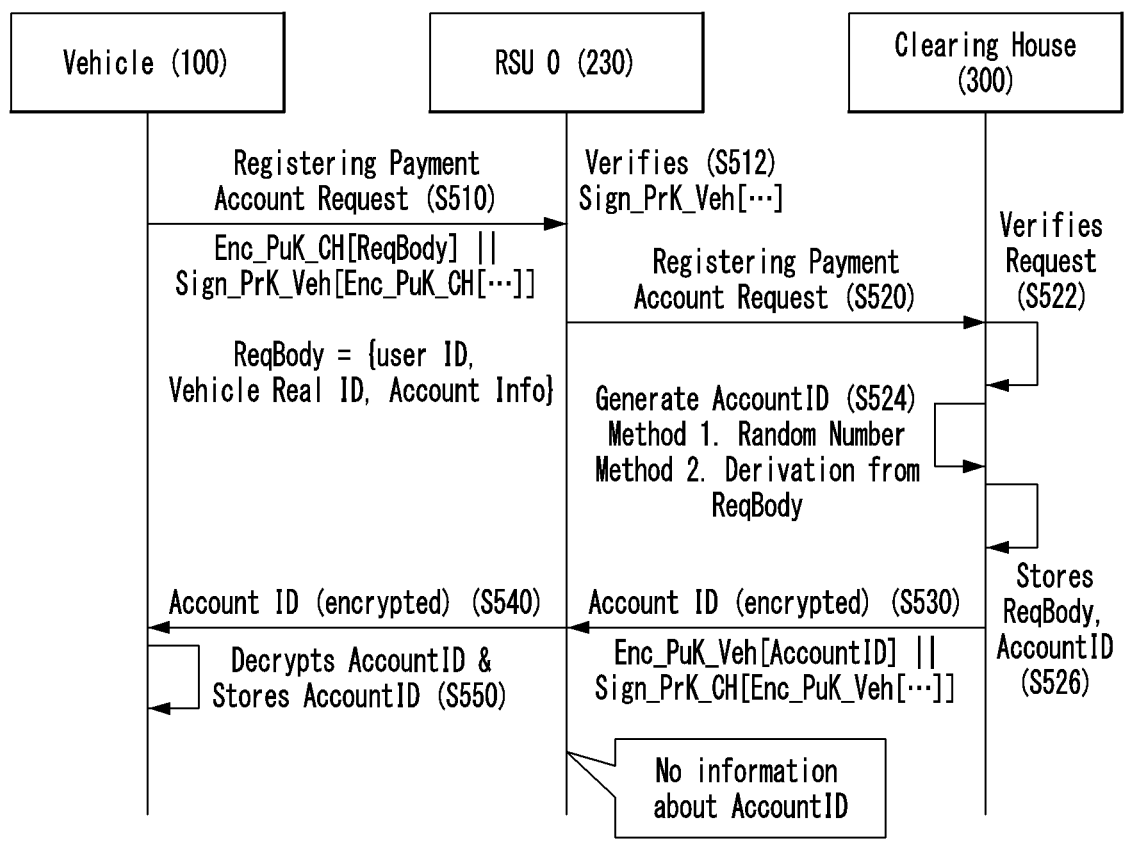
FIG. 10 is a conceptual diagram illustrating a protocol performed for registration of payment account information of a vehicle and detailed information being exchanged in a V2X-based electronic toll collection system (ETCS) according to an embodiment of the present invention.

FIG. 10 is a conceptual diagram illustrating a protocol performed for registration of payment account information of a vehicle and detailed information being exchanged in a V2X-based electronic toll collection system (ETCS) according to an embodiment of the present invention.

In FIG. 10, description of a constitution overlapping with FIG. 5 will be omitted.

The payment account registration request message transmitted from the vehicle 100 to the third roadside unit 230 at step S510 may include the following encryption item.

Enc_PuK_CH[RegBody]||Sign_PrK_Veh[Enc_PuK_CH[ReqBody]]

Here, it may be implemented as ReqBody={user ID, Vehicle Real ID, Account Info}.

Enc_PuK_CH[ReqBody] may mean the information encrypted with a public key issued by the clearing house 300 for ReqBody.

Sign_PrK_Veh[ ] may mean information encrypted with a digital signature using a private key issued by the vehicle 100 for [ ].

Operation A||B may mean concatenation of A and B.

The third roadside unit 230 may verify the payment account registration request message of the vehicle 100 at step S512.

Here, the verification process of step S512 may be performed on Sign_PrK_Veh[Enc_PuK_CH[ReqBody]].

When the message is verified as valid at step S512, the third roadside unit 230 may forward, at step S520, the payment account registration request message from the vehicle 100 to the clearing house 300.

The clearing house 300 may verify, at step S522, the payment account registration request from the vehicle 100.

When the message is verified as valid at step S522, the clearing house 300 may generate an AccountID at step S524.

At step S524, as an example of an Id generation technique, one or both of Method 1 using a random number and Method 2 using Derivation from ReqBody may be used.

The clearing house 300 may store, at step S526, ReqBody and AccountID in a manner associated with each other.

The clearing house 300 may transmit the encrypted AccountID to the third roadside unit 230 at step S530.

Here, the information transmitted at S530 may include the following item.

Enc_PuK_Veh[AccountID]||Sign_PrK_CH[Enc_PuK_Veh[AccountID]]

Here, Enc_PuK_Veh[AccountID] may mean the information encrypted with a public key issued by the vehicle 100 for AccountID, and Sign_PrK_CH[ ] may mean the information encrypted with a digital signature using a private key issued by the settlement office 300 for [ ].

The third roadside unit 230 may forward the encrypted AccountID to the vehicle 100 at step S540.

The vehicle 100 may decrypt and store the AccountID at step S550.

Here, since the encrypted AccountID is encrypted with the private keys issued by the vehicle 100 and the clearing house 300, the third roadside unit 230 may neither decrypt the AccountID nor hold any information about the AccountID.

Figure 11:
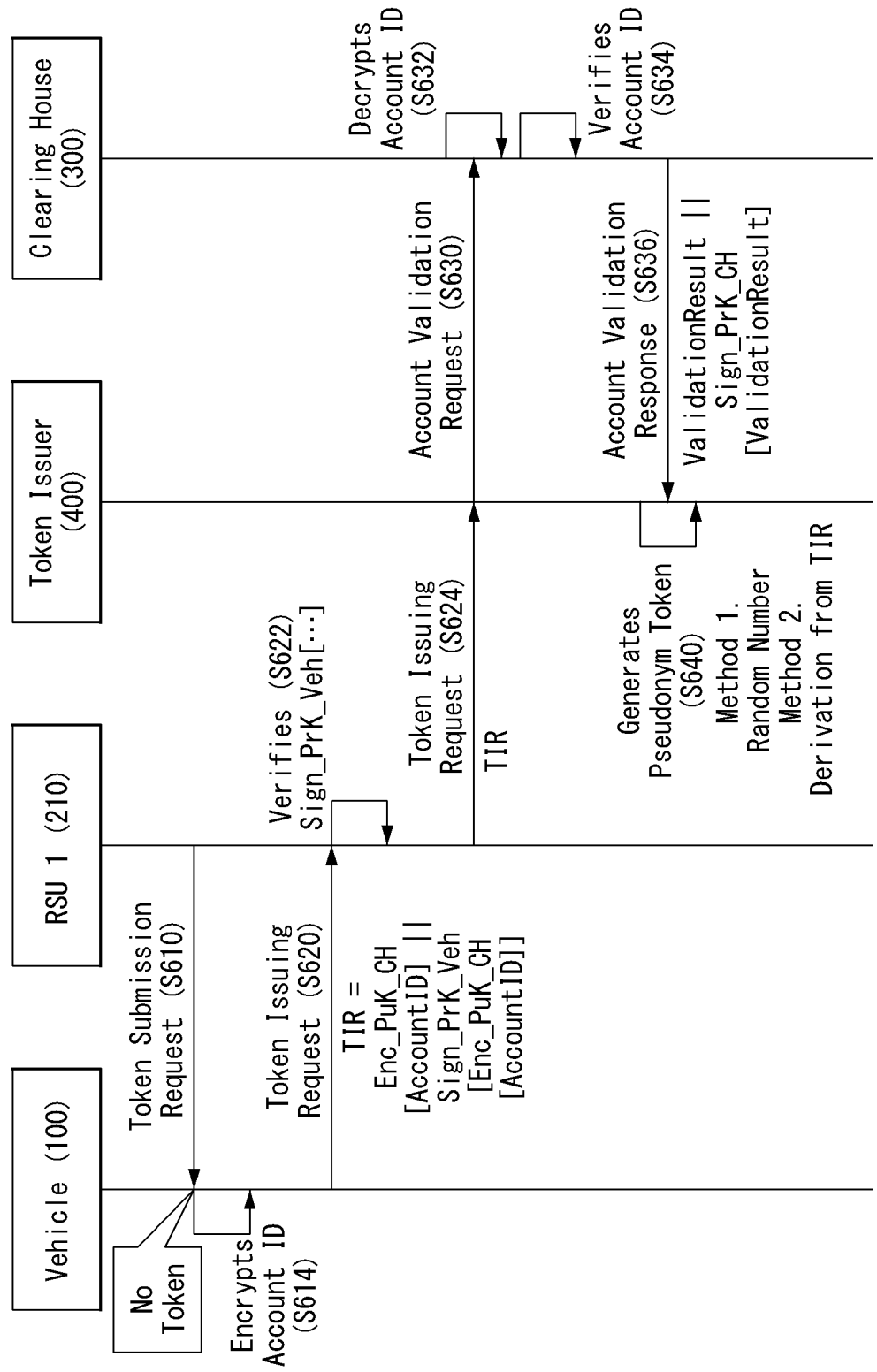
FIGS. 11 and 12 are conceptual diagrams illustrating a protocol performed to generate a de-identified token of a vehicle and detailed information being exchanged in a V2X-based Electronic Toll Collecting System (ETCS) according to an embodiment of the present invention.
Figure 12:
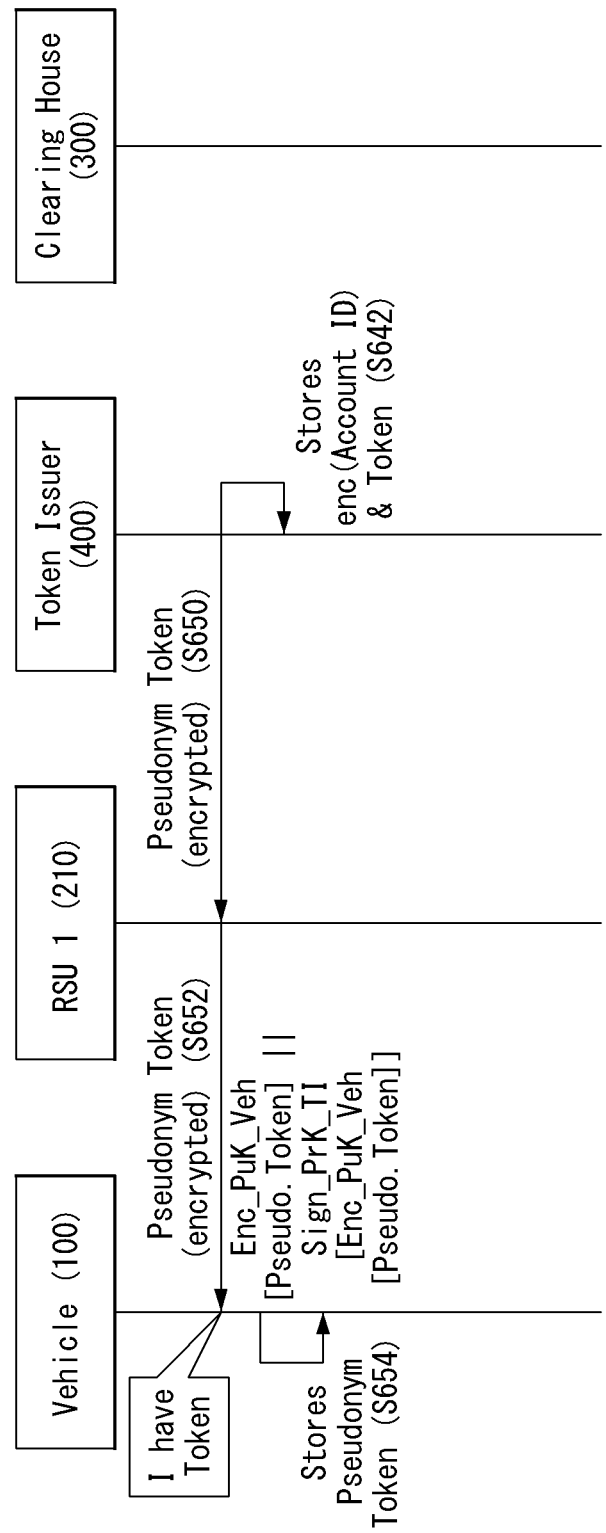

FIGS. 11 and 12 are conceptual diagrams illustrating a protocol performed to generate a de-identified token of a vehicle and detailed information being exchanged in a V2X-based Electronic Toll Collecting System (ETCS) according to an embodiment of the present invention.

In FIGS. 11 and 12, description of the constitution overlapping with FIG. 6 will be omitted.

The token issuance request (TIR) message transmitted from the vehicle 100 to the first roadside unit 210 at S620 may include the following encryption items.

TIR=Enc_PuK_CH[AccountID]||Sign_PrK_Veh[Enc_PuK_CH[AccountID]]

Here, Enc_PuK_CH[AccountID] may mean information encrypted with a public key issued by the settlement office 300 for AccountID, and Sign_PrK_Veh[ ] may mean information encrypted with a digital signature using a private key issued by the vehicle 100 for [ ].

The first roadside unit 210 may verify the TIR at step S622.

At step S622, the Sign_PrK_Veh[Enc_PuK_CH[AccountID]] item among the TIR may be used for verification.

The account validity verification request message transmitted from the token issuer 400 to the clearing house 300 at step S630 is composed of TIR||Sign_PrK_TI[TIR]. Here, Sign_PrK_IT[TIR] may mean information encrypted with a digital signature using a private key issued by the token issuer 400 for the TIR.

The clearing house 300 may acquire, at step S632, an Account ID by decrypting the account validity verification request message.

The clearing house 300 may verify the Account ID at step S634.

The response message being transmitted at step S636 in a manner of containing the account validity verification result may include the following item.

ValidationResult||Sign_PrK_CH[ValidationResult]

Here, ValidationResult is the account validity verification result, and Sign_PrK_CH[ ] may mean information encrypted with a digital signature using a private key issued by the clearing house 300 for [ ].

When the account validity verification result indicates that the Account ID is valid, the token issuer 400 may generate a pseudonymized token at S640.

At step S640, as an example of a pseudonymized token generation technique, one or both of Method 1 using a random number and Method 2 using Derivation from TIR may be used.

With reference to FIG. 12, the encrypted pseudonymization token transmitted from the token issuer 400 to the vehicle 100 via the first roadside unit 210 at steps S650 and S652 may include the following item.

Enc_PuK_Veh[Pseudo.Token]||Sign_PrK_TI[Enc_PuK_Veh[Pseudo.Token]]

Here, Pseudo.Token is a pseudonymized token, Enc_PuK_Veh[ ] may mean information encrypted with the public key issued by the vehicle 100 for [ ], and Sign_PrK_TI[ ] may mean information encrypted with a digital signature using a private key issued by the token issuer 400 for [ ].

Since the vehicle 100 has received the pseudonymized token, it now holds the token. The vehicle 100 may store the pseudonymized token at step S654.

Figure 13:
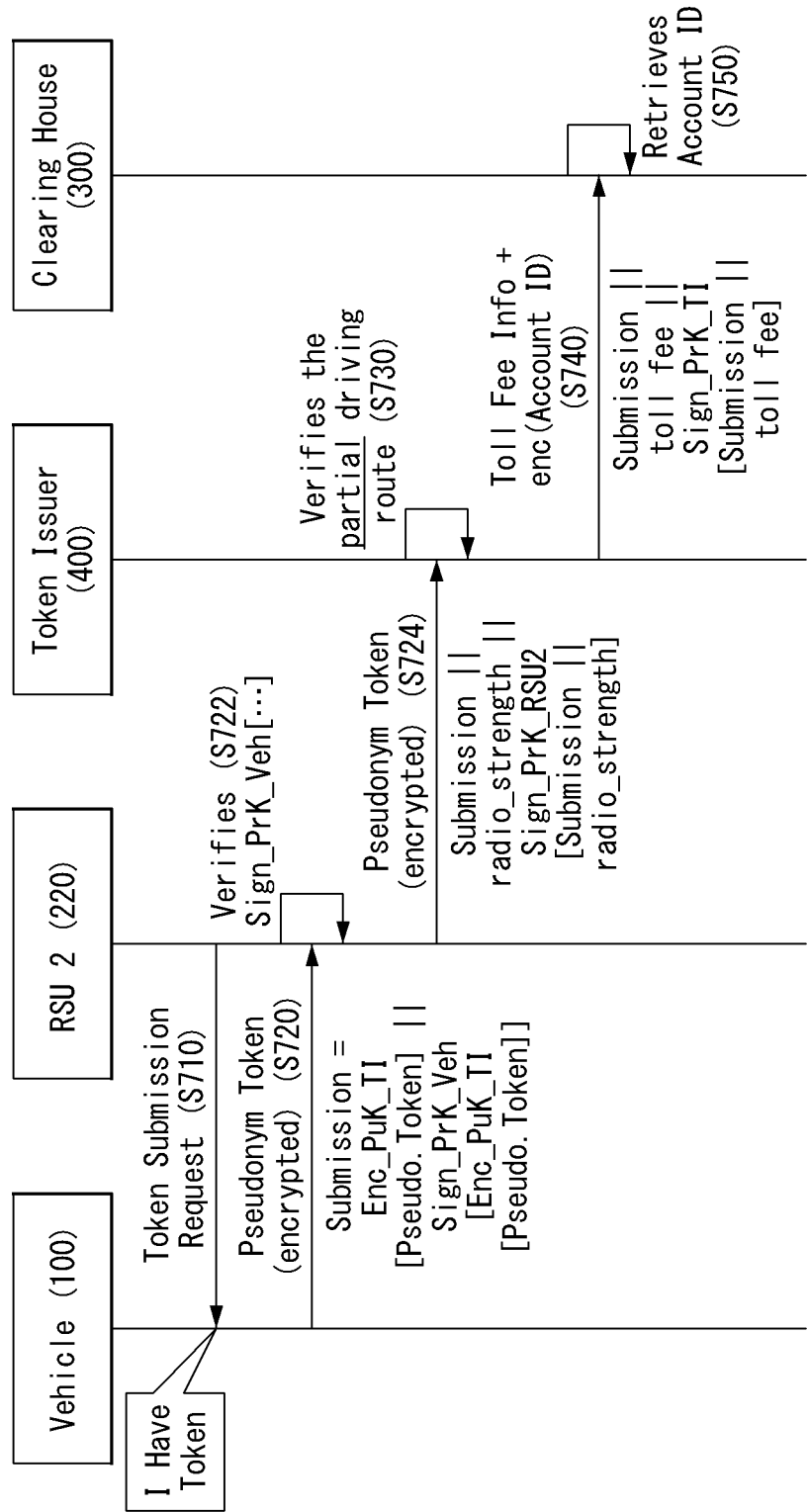
FIG. 13 is a conceptual diagram illustrating a protocol performed to identify and verify a de-identified token and generate toll information and detailed information being exchanged in V2X-based electronic toll collection system (ETCS) according to an embodiment of the present invention.

FIG. 13 is a conceptual diagram illustrating a protocol performed to identify and verify a de-identified token and generate toll information and detailed information being exchanged in V2X-based electronic toll collection system (ETCS) according to an embodiment of the present invention.

Description of the items overlapping those of FIG. 7 among the items shown in FIG. 13 will be omitted.

Although FIG. 13 illustrates the process of transmitting the pseudonymized token held by the vehicle 100 to the token issuer 400 via the second roadside unit 220 for convenience of explanation, the same concept may be applied to an exemplary case in which the token is transmitted via the first roadside unit 210 or another roadside unit (RSU) in another embodiment of the present invention.

The encrypted pseudonymization token information transmitted from the vehicle 100 to the second roadside unit 220 at S720 may include the following item. The pseudonymized token information being submitted in an encrypted manner may be expressed as Submission:

Submission=Enc_PuK_TI[Pseudo.Token]||Sign_PrK_Veh[Enc_PuK_TI[Pseudo.Token]]

Here, Enc_PuK_TI[ ] may mean information encrypted with a public key issued by the token issuer 400 for [ ]. Sign_PrK_Veh[ ] may mean information encrypted with a digital signature using a private key issued by the vehicle 100 for [ ].

The second roadside unit 220 may verify the encrypted pseudonymization token at step S722.

At step S722, the Sign_PrK_Veh[Enc_PuK_TI[Pseudo.Token]] item may be used for verification.

The encrypted pseudonymized token delivered to the token issuer 400 by the second roadside unit 220 at step S724 may include status information of the message as follows.

(Submission)||(radio_strength)||Sign_PrK_RSU2 [(Submission)||(radio_strength)]]

Here, radio_strength may mean the radio receiving strength of the message received by the second roadside unit 220 from the vehicle 100, and Sign_PrK_RSU2[ ] may mean information encrypted with a digital signature using a private key issued by the second roadside unit 220 for [ ].

The token issuer 400 may verify, at step S730, at least part of the driving route of the vehicle 100 based on the location information of at least one roadside unit 210 and 220 involved in the transaction of receiving or issuing a pseudonymized token from or to the vehicle 100.

The toll information+encrypted Account ID transmitted from the token issuer 400 to the clearing house 300 at step S740 may include the following item.

Submission||toll fee||Sign_PrK_TI[Submission||toll fee]

Here, the toll fee may mean toll information, and Sign_PrK_TI[ ] may mean information encrypted with a digital signature using a private key issued by the token issuer 400 for [ ].

Meanwhile, although not shown in FIG. 13, according to another embodiment of the present invention, the token issuer 400 may issue and transmit a new pseudonymized token to the vehicle 100 via the second roadside unit 220 between steps S730 and S740.

That is, in the new embodiment, after checking the pseudonymized token held by the vehicle 100, the token issuer 400 may issue and transmit a new pseudonymized token in order for the vehicle 100 to hold the updated pseudonymized token.

The lifetime of the pseudonymized token may be updated each time the vehicle 100 passes a new RSU, after a predetermined period of time, after passing a predetermined number of RSUs, or when entering a road with a different toll system.

In the embodiment in which the pseudonymized token is updated, the pseudonymized token generation step S640, the pseudonymized token storage step S642, and the pseudonymization token delivery steps S650 and S652, and the pseudonymized token storage step S654, which are shown in FIGS. 6, 11, and 12, may be performed in a modified manner to suit the RSU through which the message is delivered between steps S730 and S740.

Figure 14:
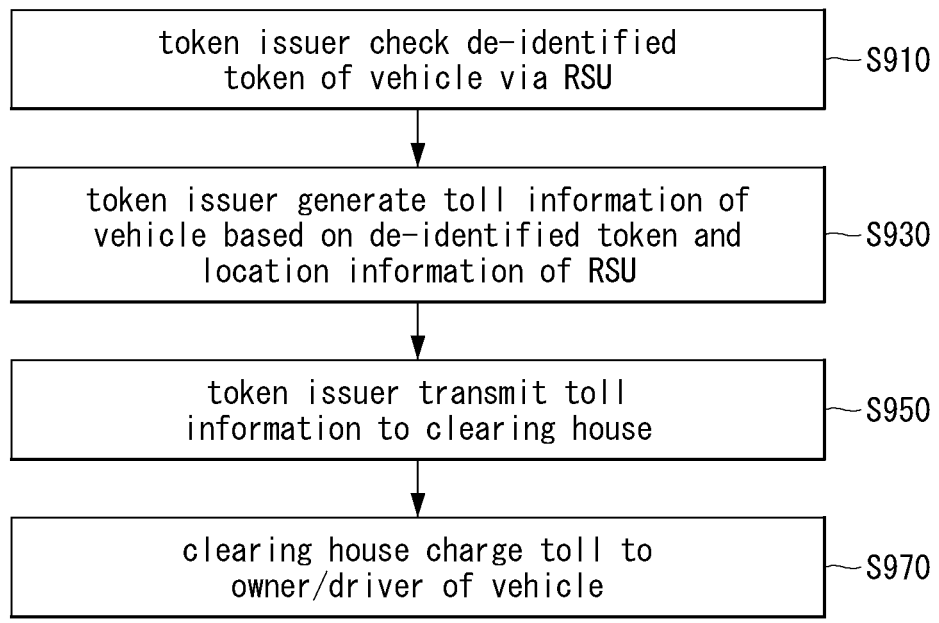
FIG. 14 is an operation flowchart illustrating a V2X-based electronic toll collection method according to an embodiment of the present invention.

FIG. 14 is an operation flowchart illustrating a V2X-based electronic toll collection method according to an embodiment of the present invention.

The V2X communication-based electronic toll collection method according to an embodiment of the present invention includes checking, at the token issuer 400, a de-identified token by communicating with an on-board unit (OBU) 110 of vehicle 100 via at least one roadside unit (RSU) 210 and 220 at step S910, generating, at the token issuer 400, toll information of the vehicle, at step S930, based on the de-identified token of the vehicle 100 and the location information of the at least one roadside unit 210 and 220 involved in the process of checking the de-identified token, forwarding, at the token issuer 400, the toll information to the clearing house 300 at step S950, and charging, at the clearing house 300, the toll to the driver/owner of the vehicle 100 at step S970.

Step S910 for the token issuer 400 to check the de-identified token may include issuing and transmitting, at the token issuer 400, a de-identified token to the vehicle 100 via the first roadside unit 210 (S640, S650, and S652) or receiving the previously issued de-identified token from the vehicle 100 via the first roadside unit 210 and verifying the token, and receiving, at the token issuer 400 the previously issued de-identified token from the vehicle 100 via the second roadside unit 220 and verifying the token (S720, S722, S724, and S730).

The token issuer 400 may generate toll information of the vehicle 100 based on the first location information about the first roadside unit 210 and the second location information about the second roadside unit 220 at the toll information generation step S930.

The V2X communication-based electronic toll collection method according to an embodiment of the present invention may further include transmitting, at the at least one roadside unit 210 and 220, a message requesting submission of a de-identified token to the vehicle (S610 and S710), forwarding, at the at least one roadside unit 210 and 220 when receiving a message requesting issuance of a de-identified token from the vehicle 100 (S610), the message requesting issuance of a de-identified token to the token issuer 400 (S624), and forwarding, at the at least one roadside unit 210 and 220 when receiving the de-identified token from the vehicle (S720), the de-identified token to the token issuer 400 (S724).

Step S910 for the token issuer 400 to check the de-identified token may include receiving a message requesting issuance of a de-identified token from the vehicle 100 via the first roadside unit 210 (S620 and S624), issuing a de-identified token (S640), and transmitting the de-identified token to the vehicle 100 via the first roadside unit 210 (S650 and S652).

Step S910 for the token issuer 400 to identify the de-identified token may further include transmitting, after receiving the message requesting issuance of a de-identified token (S620 and 624), a message requesting verification of the validity of the identification information of the vehicle 100 included in the message requesting issuance of a de-identified token to the clearing house 300 (S630), and receiving a message including the validity verification result on the identification information of the vehicle from the clearing house 300 (S636).

Here, in the step of issuing the de-identified token (S640), when the validity of the identification information of the vehicle 100 is verified by the clearing house 300 based on the message including the verification result of the validity, the de-identified token may be issued.

The V2X communication-based electronic toll collection method according to an embodiment of the present invention may further includes receiving, at the third roadside unit 230, a message requesting registration of payment account information from the vehicle 100 (S510), and forwarding, at the third roadside unit 230, the message requesting registration of payment account information to the clearing house 300 (S520).

Figure 15:
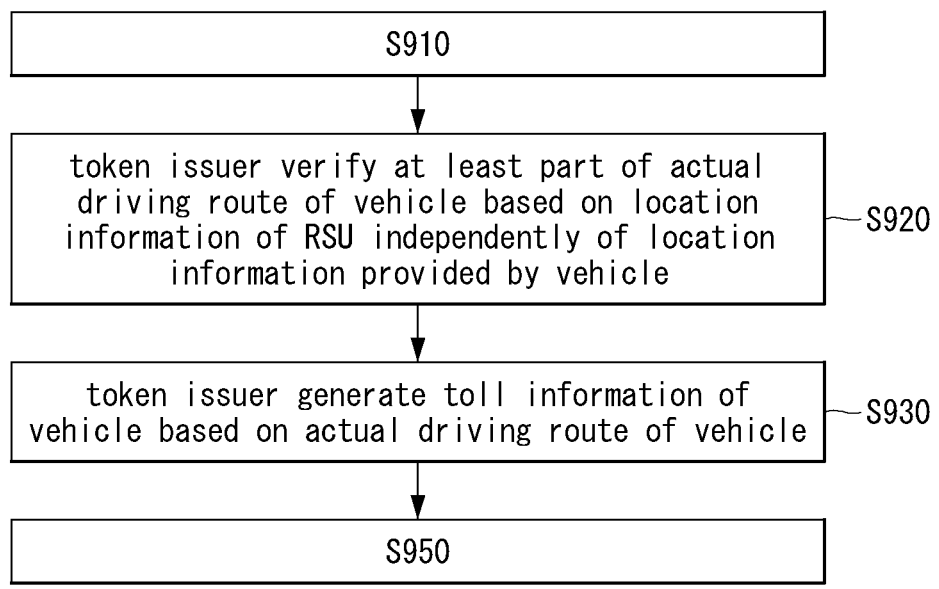
FIG. 15 is an operation flowchart illustrating a V2X-based electronic toll collection method according to an embodiment of the present invention.

FIG. 15 is an operation flowchart illustrating a V2X-based electronic toll collection method according to an embodiment of the present invention.

Step S930 for the token issuer 400 to generate toll information may include verifying at least part of the actual driving route of the vehicle 100 independently of the location information of the vehicle 100 that is provided by the on-board unit 110 of the vehicle 100 (S920).

At step S930 for the token issuer 400 to generate the toll information, the toll information of the vehicle 100 may be generated independently of the location information of the vehicle 100 provided by the on-board unit 110 of the vehicle 100.

Figure 16:
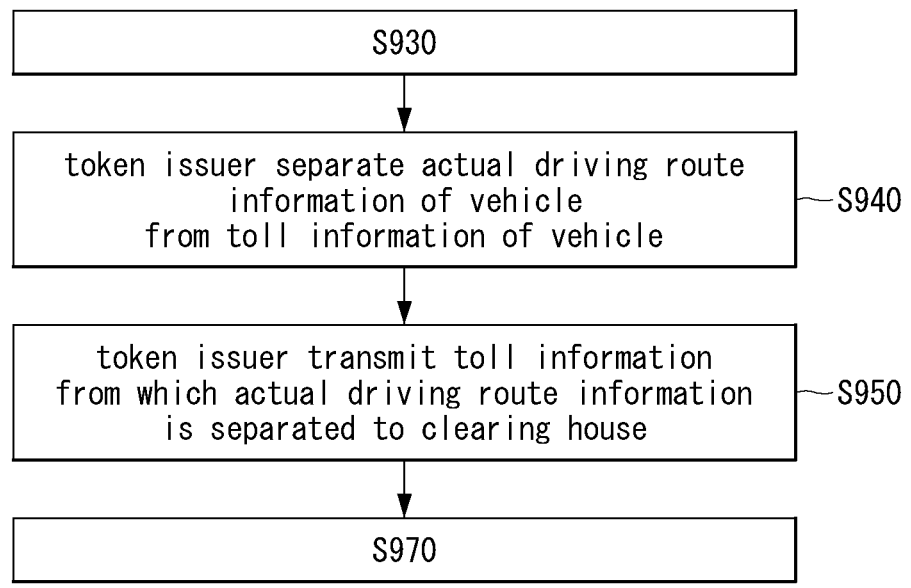
FIG. 16 is an operation flowchart illustrating a V2X-based electronic toll collection method according to an embodiment of the present invention.

FIG. 16 is an operation flowchart illustrating a V2X-based electronic toll collection method according to an embodiment of the present invention.

At step S950 for the token issuer 400 to transmit the toll information to the clearing house 300, the toll information of the vehicle 100 may be separated from the actual location information of the vehicle 100 (S940) and transmitted to the clearing house 300.

With reference to the embodiments of FIGS. 3 to 16, the convergence of new technologies with a vehicle network including vehicles facilitates vehicle-to-vehicle and vehicle-to-infrastructure communications. V2X communication between smartphones, clouds and other devices and vehicles will be possible.

The dedicated short-range communications (DSRC) protocol for V2V networks uses a dual-communication protocol channel operating on a 5.9 GHz band with a bandwidth of 75 MHz specifically designed for automotive use, and wireless access in vehicular environments (WAVE) and IEEE 802.11p are commonly used for V2X communications. DSRC, WAVE and IEEE 802.11p have known vulnerabilities that an attacker could exploit.

Figure 17:
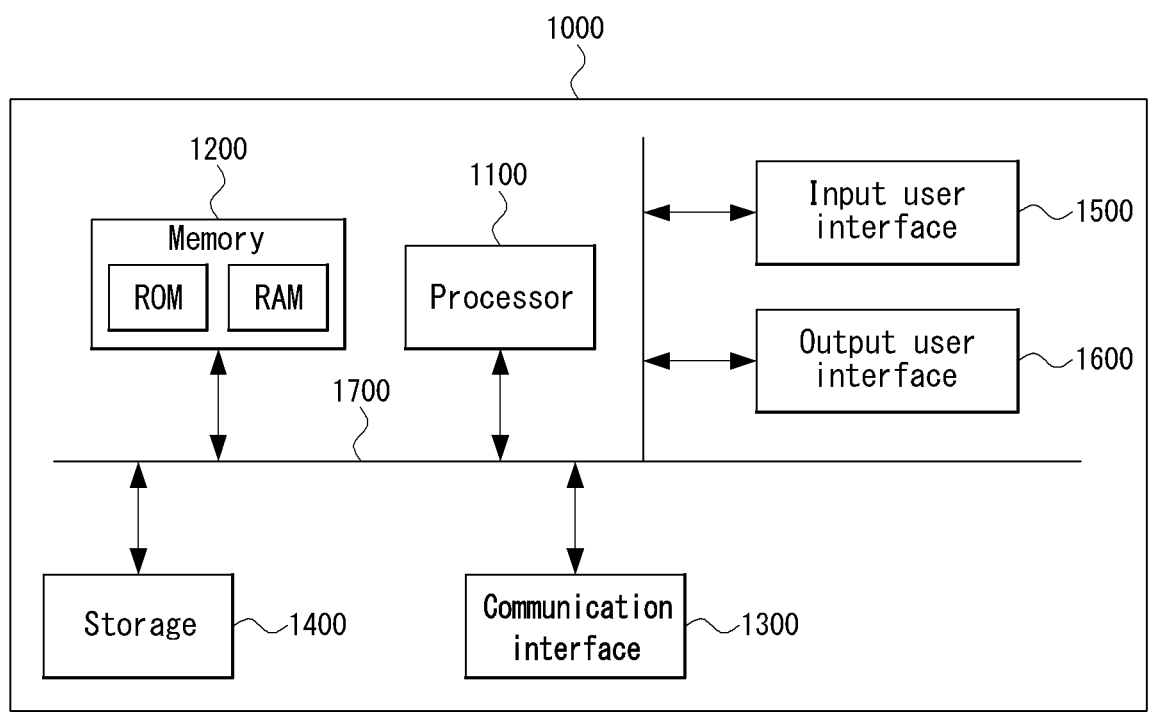
FIG. 17 is a conceptual diagram illustrating an example of each entity or computing system of a generalized electronic toll collection system (ETCS) capable of performing at least part of the process of FIGS. 3 to 16.

FIG. 17 is a conceptual diagram illustrating an example of each entity or computing system of a generalized electronic toll collection system (ETCS) capable of performing at least part of the process of FIGS. 3 to 16.

At least a part of the process of the electronic toll collection method according to an embodiment of the present invention may be executed by the computing system 1000 of FIG. 17.

With reference to FIG. 17, the computing system 1000 according to an embodiment of the present invention may include a processor 1100, a memory 1200, a communication interface 1300, a storage device 1400, an input interface 1500, an output 1600, and a bus 1700.

The computing system 1000 according to an embodiment of the present invention may include at least one processor 1100 and a memory 1200 storing instructions for instructing the at least one processor 1100 to perform at least one step. At least some steps of the method according to an embodiment of the present invention may be performed by the at least one processor 1100 loading and executing instructions from the memory 1200.

The processor 1100 may refer to a central processing unit (CPU), a graphics processing unit (GPU), or a dedicated processor on which the methods according to embodiments of the present invention are performed.

Each of the memory 1200 and the storage device 1400 may be configured as at least one of a volatile storage medium and a non-volatile storage medium. For example, the memory 1200 may be configured as at least one of read-only memory (ROM) and random access memory (RAM).

Also, the computing system 1000 may include a communication interface 1300 for performing communication through a wireless network.

In addition, the computing system 1000 may further include a storage device 1400, an input interface 1500, an output interface 1600, and the like.

In addition, the components included in the computing system 1000 may each be connected to a bus 1700 to communicate with each other.

An ETCS and an operation method thereof according to an embodiment of the present invention are advantageous in terms of being able to perform vehicle authentication, location tracking, and toll collection robustly even in an environment where GPS signals and communication signals are unstable.

An ETCS and an operation method thereof according to an embodiment of the present invention are advantageous in terms of effectively collecting a toll despite an attempt by a dishonest user to obstruct the charging by hiding the vehicle location information.

An ETCS and an operation method thereof according to an embodiment of the present invention are advantageous in terms of separating the actual driving information and location information of the vehicle from the toll information and providing a clearing house with only the toll information in which the actual driving and location information of the vehicle is separated.

An ETCS and an operation method thereof according to an embodiment of the present invention are still advantageous in terms of stably collecting a toll and protect the location privacy of the vehicle.

The computing system of the present invention may be implemented as a communicable desktop computer, a laptop computer, a notebook, a smart phone, a tablet personal computer (PC), a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, digital video recorder, digital video player, a personal digital assistant (PDA), etc.

The operation of the method according to an embodiment of the present invention may be implemented as a computer-readable program or code on computer-readable recording media. Computer-readable recording media include all types of recording devices in which information readable by a computer system is stored. The computer-readable recording media may also be distributed in a network-connected computer system to store and execute computer-readable programs or codes in a distributed manner.

The computer-readable recording medium may also include a hardware device specially configured to store and execute program instructions, such as a read only memory (ROM), a random access memory (RAM), and a flash memory. The program instructions may include not only machine language codes such as those generated by a compiler, but also high-level language codes that executable by a computer using an interpreter or the like.

Although some aspects of the present invention have been described in the context of an apparatus, it may also represent a description according to a corresponding method, wherein a block or apparatus corresponds to a method step or feature of a method step. Similarly, aspects described in the context of a method may also represent a corresponding block or item or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

In embodiments, a programmable logic device (e.g., a field programmable gate array) may be used to perform some or all of the functions of the methods described herein. In embodiments, a field-programmable gate array may operate in conjunction with a microprocessor to perform one of the methods described herein. In general, the methods are preferably performed by some hardware device.

Although described above with reference to the preferred embodiments of the present invention, it should be understood that those skilled in the art can variously modify and change the present invention within the scope without departing from the spirit and scope of the present invention as set forth in the claims below.

What is claimed is:

1. A vehicle-to-everything (V2X) communication-based electronic toll collection system (ETCS) comprising:
    at least one roadside unit (RSU);
    a token issuer for checking de-identified tokens of a vehicle by communicating with an on-board unit (OBU) of the vehicle via the at least one roadside unit; and
    a clearing house communicating with the token issuer and charging a toll to a driver/owner of the vehicle,
    wherein the token issuer is further configured to:
    receive a message requesting issuance of a de-identified token from the vehicle via a first roadside unit located at a first location;
    issue the de-identified token;
    transmit the de-identified token to the vehicle via the first roadside unit;
    receive the de-identified token from the vehicle via a second roadside unit located at a second location;
    verify the de-identified token received from the vehicle via the second roadside unit;
    generate toll information of the vehicle based on the de-identified token of the vehicle and the first location of the first roadside unit and the second location of the second roadside unit involved in checking the de-identified token, wherein the toll information has been separated from actual location information of the vehicle to protect location privacy of the vehicle; and
    transmit the toll information separated from the actual location information of the vehicle to the clearing house.

2. The system of claim 1, wherein the at least one roadside unit transmits a message requesting submission of the de-identified token to the vehicle, forwards, upon receipt of a message requesting issuance of a de-identified token from the vehicle, the message requesting issuance of a de-identified token to the token issuer, and forwards, upon receipt of the issued de-identified token from the vehicle, the de-identified token to the token issuer.

3. The system of claim 1, wherein the token issuer transmits to the clearing house a message requesting verification of validity of identification information of the vehicle that is included in the message requesting issuance of a de-identified token and issues, upon the clearing house verifying the validity of the identification information of the vehicle, the de-identified token.

4. The system of claim 1, further comprising a third roadside unit receiving a message requesting registration of payment account information from the vehicle and forwarding the message to the clearing house.

5. The system of claim 1, wherein the token issuer verifies at least part of an actual driving route of the vehicle independently of location information of the vehicle that is provided by the on-board unit of the vehicle.

6. The system of claim 1, wherein the token issuer generates the toll information of the vehicle independently of location information of the vehicle that is provided by the on-board unit of the vehicle.

7. A vehicle-to-everything (V2X) communication-based electronic toll collection method comprising:
    receiving, at a token issuer, a message requesting issuance of a de-identified token from the vehicle by communicating with an on-board unit (OBU) of the vehicle via a first roadside unit RSU) located at a first location;
    issuing, at the token issuer, the de-identified token;
    transmitting, at the token issuer, the de-identified token to the vehicle via the first roadside unit;
    receiving, at the token issuer, the issued de-identified token from the vehicle via a second roadside unit located at a second location;
    verifying, at the token issuer, the de-identified token received from the vehicle via the second roadside unit;
    generating, at the token issuer, toll information of the vehicle based on the de-identified token of the vehicle and the first location of the first roadside unit and second location of the second roadside unit involved in checking the de-identified token, wherein the toll information has been separated from actual location information of the vehicle to protect location privacy of the vehicle;

transmitting, at the token issuer, the toll information separated from the actual location information of the vehicle to a clearing house; and charging, at the clearing house, a toll to a driver/owner of the vehicle.

8. The method of claim 7, further comprising:

transmitting, at the at least one roadside unit, a message requesting submission of the de-identified token to the vehicle;

forwarding, at the at least one roadside unit upon receipt of a message requesting issuance of a de-identified token from the vehicle, the message requesting issuance of a de-identified token to the token issuer; and forwarding, at the at least one roadside unit upon receipt of the issued de-identified token from the vehicle, the de-identified token to the token issuer.

9. The method of claim 7, wherein checking, at the token issuer, the de-identified token comprises:

transmitting, after receiving the message requesting issuance of a de-identified token, to the clearing house a message requesting verification of validity of identification information of the vehicle that is included in the message requesting issuance of a de-identified token; and receiving a message including a validity verification result on the identification information of the vehicle from the clearing house, wherein issuing the de-identified token comprises issuing, upon the clearing house verifying the validity of the identification information of the vehicle based on the message including the validity verification result, the de-identified token.

10. The method of claim 7, further comprising:

receiving, at a third roadside unit, a message requesting registration of payment account information from the vehicle; and forwarding the message requesting registration of payment account information to the clearing house.

11. The method of claim 7, wherein generating, at the token issuer, the toll information comprises verifying at least part of an actual driving route of the vehicle independently of location information of the vehicle that is provided by the on-board unit of the vehicle.

12. The method of claim 7, wherein generating, at the token issuer, the toll information comprises generating the toll information of the vehicle independently of location information of the vehicle that is provided by the on-board unit of the vehicle.

* * * * *